United States Patent
Ruthemeyer et al.

(10) Patent No.: US 10,132,242 B2
(45) Date of Patent: Nov. 20, 2018

(54) CONNECTING GAS TURBINE ENGINE ANNULAR MEMBERS

(71) Applicant: General Electric Company, Schenectady, NY (US)

(72) Inventors: Michael Anthony Ruthemeyer, Cincinnati, OH (US); Darrell Glenn Senile, Oxford, OH (US); Bernard James Renggli, Cincinnati, OH (US); Randy Lee Lewis, Lebanon, OH (US)

(73) Assignee: General Electric Company, Schenectady, OH (US)

( * ) Notice: Subject to any disclaimer, the term of this patent is extended or adjusted under 35 U.S.C. 154(b) by 702 days.

(21) Appl. No.: 14/396,206

(22) PCT Filed: Apr. 26, 2013

(86) PCT No.: PCT/US2013/038352
§ 371 (c)(1),
(2) Date: Oct. 22, 2014

(87) PCT Pub. No.: WO2013/163510
PCT Pub. Date: Oct. 31, 2013

(65) Prior Publication Data
US 2015/0075176 A1 Mar. 19, 2015

Related U.S. Application Data

(60) Provisional application No. 61/639,397, filed on Apr. 27, 2012.

(51) Int. Cl.
*F02C 7/20* (2006.01)
*F02K 1/04* (2006.01)
(Continued)

(52) U.S. Cl.
CPC .......... *F02C 7/20* (2013.01); *F02K 1/04* (2013.01); *F02K 1/80* (2013.01); *F23R 3/007* (2013.01); *F02K 1/48* (2013.01); *Y02T 50/672* (2013.01)

(58) Field of Classification Search
CPC ..... F02K 1/40; F02K 1/80; F02K 1/04; F02C 7/20; F23R 3/007; F23R 3/60; F23R 3/50
See application file for complete search history.

(56) References Cited

U.S. PATENT DOCUMENTS

| 4,438,626 A | 3/1984 | Berestecki |
| 4,570,968 A | 2/1986 | Mukai et al. |

(Continued)

FOREIGN PATENT DOCUMENTS

| CN | 201133403 Y | 10/2008 |
| CN | 101407231 A | 4/2009 |

(Continued)

OTHER PUBLICATIONS

Unofficial English Translation of Chinese Office Action issued in connection with corresponding CN Application No. 201380022136.6 dated Dec. 30, 2016.

(Continued)

*Primary Examiner* — Craig Kim
(74) *Attorney, Agent, or Firm* — General Electric Company; William Andes

(57) ABSTRACT

A gas turbine engine assembly includes first and second annular members having different first and second thermal expansion coefficients connected together with dual arm V brackets. Brackets include first and second arms angularly spaced apart from a bracket centerline and extending axially away from bracket bases attached to a first one of the first and second annular members. Arms are attached to a second one of the first and second annular members. A turbine frame (Continued)

includes struts extending between outer and inner rings. An annular mixer and centerbody substantially made from a ceramic matrix composite materials is connected to and supported by the outer and inner rings with first and second sets respectively of the dual arm V brackets. Bracket bases of the first and second sets are attached to the outer and inner rings respectively. Arms of the first and second sets are attached to mixer and centerbody respectively.

16 Claims, 10 Drawing Sheets

(51) Int. Cl.
*F02K 1/80* (2006.01)
*F23R 3/00* (2006.01)
*F02K 1/48* (2006.01)

(56) References Cited

U.S. PATENT DOCUMENTS

| | | | |
|---|---|---|---|
| 6,732,532 | B2 | 5/2004 | Camy et al. |
| 7,153,054 | B2 | 12/2006 | Arbona |
| 7,261,489 | B2 | 8/2007 | Arbona et al. |
| 7,677,026 | B2 | 3/2010 | Conete et al. |
| 7,967,562 | B2 | 6/2011 | Frost et al. |
| 8,061,977 | B2 | 11/2011 | Keller et al. |
| 8,424,312 | B2 | 4/2013 | Conete et al. |
| 8,556,531 | B1 | 10/2013 | Bird et al. |
| 8,590,316 | B2 | 11/2013 | Conete et al. |
| 8,834,056 | B2 | 9/2014 | Keith et al. |
| 8,919,136 | B2 | 12/2014 | Conete |
| 2006/0112675 | A1* | 6/2006 | Anderson ............... F02K 1/386 60/262 |
| 2010/0205930 | A1* | 8/2010 | Conete ................... F02K 1/04 60/226.1 |

FOREIGN PATENT DOCUMENTS

| | | |
|---|---|---|
| CN | 101407234 A | 4/2009 |
| CN | 201696424 U | 1/2011 |
| EP | 0622538 A1 | 11/1994 |
| EP | 1439350 A2 | 7/2004 |
| EP | 2048072 A1 | 4/2009 |
| FR | 2914955 A1 | 10/2008 |
| FR | 2916018 A1 | 11/2008 |
| FR | 2935753 A1 | 3/2010 |
| JP | 2003021334 A | 1/2003 |
| JP | 2005330958 A | 12/2005 |
| JP | 2005330960 A | 12/2005 |
| JP | 2008514848 A | 5/2008 |
| JP | 2009063166 A | 3/2009 |

OTHER PUBLICATIONS

Unofficial English Translation of Japanese Office Action issued in connection with corresponding JP Application No. 2015-509170 dated Feb. 9, 2016.

International Search Report and Written Opinion issued in connection with corresponding PCT Application No. PCT/US2013/038352 dated Sep. 5, 2013.

* cited by examiner

CONNECTING GAS TURBINE ENGINE ANNULAR MEMBERS

CROSS-REFERENCE TO RELATED APPLICATIONS

The present application claims priority to U.S. Provisional Patent Application Ser. No. 61/639,397, entitled "CONNECTING GAS TURBINE ENGINE ANNULAR MEMBERS", filed Apr. 27, 2012, the disclosure of which is hereby incorporated by reference.

BACKGROUND OF THE INVENTION

Field of the Invention

Embodiments of the present invention relate to connecting gas turbine engine annular members and, particularly, to such members having different thermal expansion coefficients and used in hot sections of the engine.

Description of Related Art

Many annular members of gas turbine engines are generally made of metal and held together by axially extending bolts through bolt holes provided in flanges of the annular members. Examples of such members include centerbodies and mixers located downstream of turbines of the engine and which are used to mix fan bypass airflow with core engine airflow exiting the turbines. Centerbodies and mixers are typically mounted to a metallic rear turbine frame of the engine. Other examples of such members include ducts, cowls, combustor liners, and shrouds.

These annular members in a gas turbine engine hot section are subject to very high temperatures and it has been suggested to make some of them from high temperature composite materials such as ceramic matrix composite (CMC) material. The CMC or composite annular members are mounted to and supported by metallic annular members. Unfortunately, metal materials and composite materials have coefficients of thermal expansion that are very different. This gives rise to particularly severe problems in making connections between the CMC or composite annular members and the supporting metallic annular members at the interface of the two types annular members. The problem is further compounded by the brittleness of CMC.

Thus, it is highly desirable to provide a connection to connect and support a first annular member from a second annular member in a hot section of a gas turbine engine wherein the first and second annular members are made of materials have very different coefficients of thermal expansion. It is highly desirable to provide such a connection wherein the first annular member is made from high temperature composite materials such as ceramic matrix composite (CMC) material and the second annular member is metallic. It is also highly desirable to provide such a connection wherein the first annular member is a CMC centerbody or mixer attached to and supported by a metallic annular rear turbine frame of the engine

SUMMARY OF THE INVENTION

A gas turbine engine assembly includes gas turbine engine first and second annular members having different first and second thermal expansion coefficients and connected together with dual arm brackets. Each of the dual arm brackets includes first and second arms angularly spaced apart from a bracket centerline and extending axially away from a bracket base. The bracket bases are attached to a first one of the first and second annular members and the first and second arms are attached to a second one of the first and second annular members.

The second annular member may be substantially made from a ceramic matrix composite material and the first annular member may be made at least in part of a metallic material. The first and second annular members may be disposed in a gas turbine engine hot section.

The bracket bases and the first and second arms may be substantially flat and first screws or bolts may be disposed through base holes in the bracket bases attaching the bracket bases to the first one of the first and second annular members. Second screws or bolts may be disposed through first and second arm holes in distal ends of the first and second arms respectively attaching the first and second arms to the second one of the first and second annular members. The bracket bases may be bracket flanged bases angled with respect to the first and second arms and may be angled substantially 90 degrees or perpendicular with respect to the first and second arms.

The dual arm brackets may be clamped bent rod brackets including bent rods mounted to rod clamps and having first and second rod arms and rod bases therebetween. The rod clamps include clamp loops securing the rod bases to the clamps. First screws or bolts disposed through clamp holes in the rod clamps attach the rod clamps to the first one of the first and second annular members and second screws or bolts disposed through ring connectors at distal ends of the first and second rod arms attach the first and second rod arms to the second one of the first and second annular members. The bent rods may be hollow or solid. The clamp loops may be cushioned.

The dual arm brackets may include clamp straps and bent rods including first and second rod arms extending axially away from the rod bases between the first and second rod arms. The clamp straps include strap loops extending between two spaced apart loop bases. First screws or bolts disposed through strap holes in the loop bases clamp the rod bases to the first one of the first and second annular members and second screws or bolts disposed through ring connectors at distal ends of the first and second rod arms attach the first and second rod arms to the second one of the first and second annular members.

A gas turbine engine assembly includes a turbine frame with annular outer and inner casings or rings circumscribed about a centerline axis and a plurality of circumferentially spaced apart struts extending therebetween. An annular mixer and/or an annular centerbody substantially made from ceramic matrix composite materials and circumscribed about the centerline axis are mounted to the turbine frame. The annular mixer includes a plurality of mixer chutes and is connected to and supported by the outer ring with dual arm brackets. The annular centerbody is connected to and supported by the inner ring with dual arm flat brackets.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
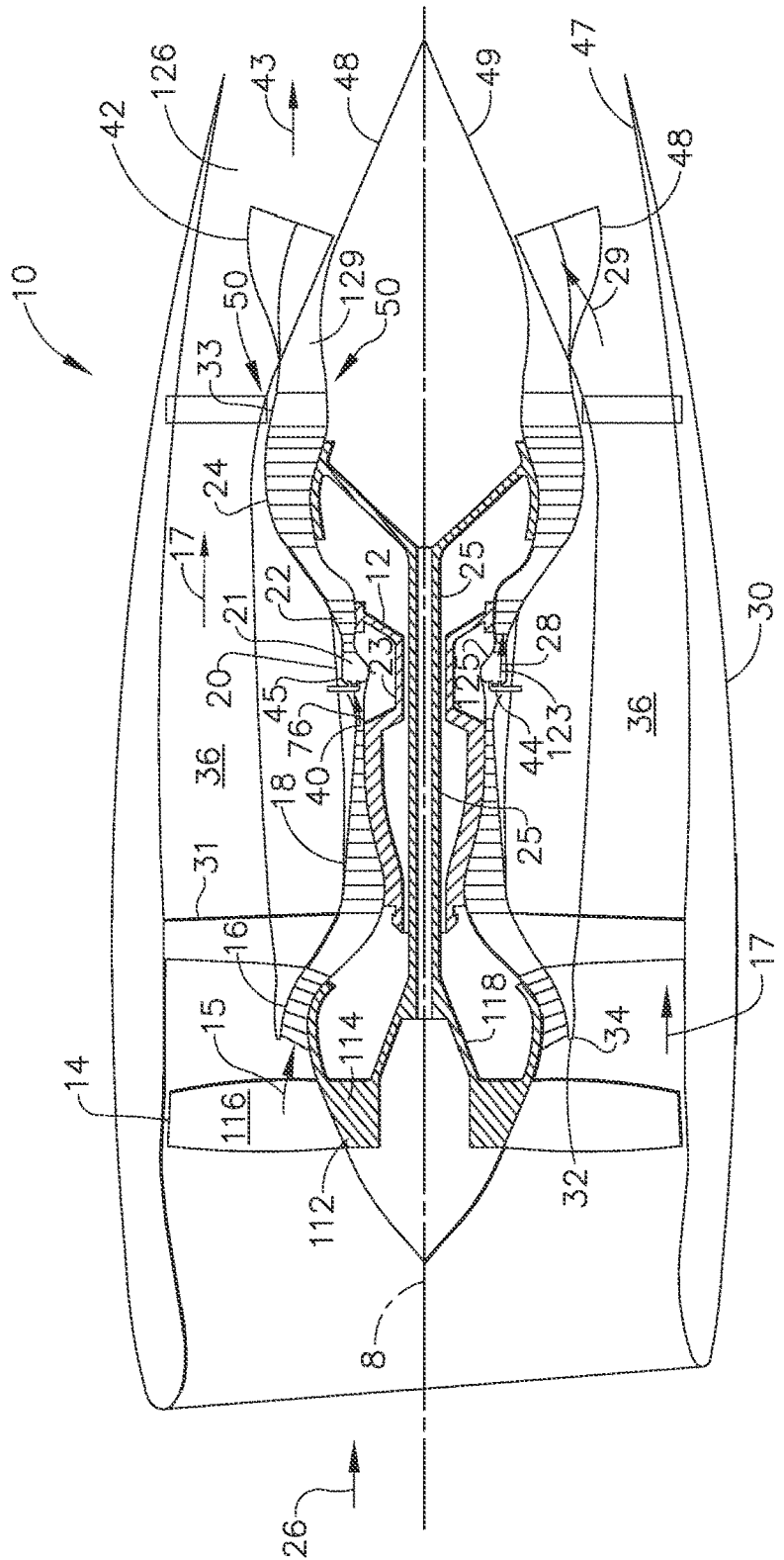
FIG. 1 is a cross-sectional side view illustration of an exemplary embodiment of an aircraft turbofan gas turbine engine with an exemplary embodiments of a CMC centerbody and a CMC mixer mounted on a metallic rear turbine frame.

Illustrated in FIG. 1 is an exemplary aircraft turbofan gas turbine engine 10 circumscribed about an engine centerline axis 8 and suitably designed to be mounted to a wing or fuselage of an aircraft. The engine 10 includes, in downstream serial flow communication, a fan 14, a low pressure compressor or booster 16, a high pressure compressor (HPC) 18, a combustor 20, a high pressure turbine (HPT) 22, and a low pressure turbine (LPT) 24. The HPT or high pressure turbine 22 is joined by a high pressure drive shaft 23 to the high pressure compressor 18 in what is referred to as a high pressure rotor 12. The LPT or low pressure turbine 24 is joined by a low pressure drive shaft 25 to both the fan 14 and the booster 16. The fan 14 includes a fan rotor 112 having a plurality of circumferentially spaced apart fan blades 116 which extend radially outwardly from a fan disk 114. The fan disk 114 and the low pressure compressor or booster 16 are connected to a fan shaft 118 that is connected to the low pressure drive shaft 25 and is powered by the LPT 24.

In typical operation, air 26 is pressurized by the fan 14. A flow splitter 34 surrounding the booster 16 immediately behind the fan 14 includes a sharp leading edge 32 which splits the fan air 26 pressurized by the fan 14 into a radially inner air flow 15 channeled through the booster 16 and a radially outer air flow 17 channeled through a bypass duct 36. The inner air flow 15 is further pressurized by the booster 16. A fan casing 30 surrounding the fan 14 is supported by an annular fan frame 31. The pressurized air in the inner air flow 15 is then flowed to the high pressure compressor 18 which further pressurizes the air.

Compressor discharge pressure (CDP) air 75 from the last stage 40 of the high pressure compressor 18 flows into a combustion chamber 45 of the combustor 20 and then into a combustion zone 21 between annular outer and inner liners 123, 125 in the combustor 20. The pressurized air is mixed with fuel provided by a plurality of fuel nozzles 44 and the mixture ignited in the combustion zone 21 of the combustor 20 to generate hot combustion gases 28 that flow downstream through the HPT 22 and the LPT 24. The combustion produces hot combustion gases 28 that flow through the high pressure turbine 22 causing rotation of the high pressure rotor 12 and then continues downstream for further work extraction in the low pressure turbine 24. The low pressure drive shaft 25 is rotatably supported by the fan frame 31 and a rear turbine frame 33.

Figure 2:
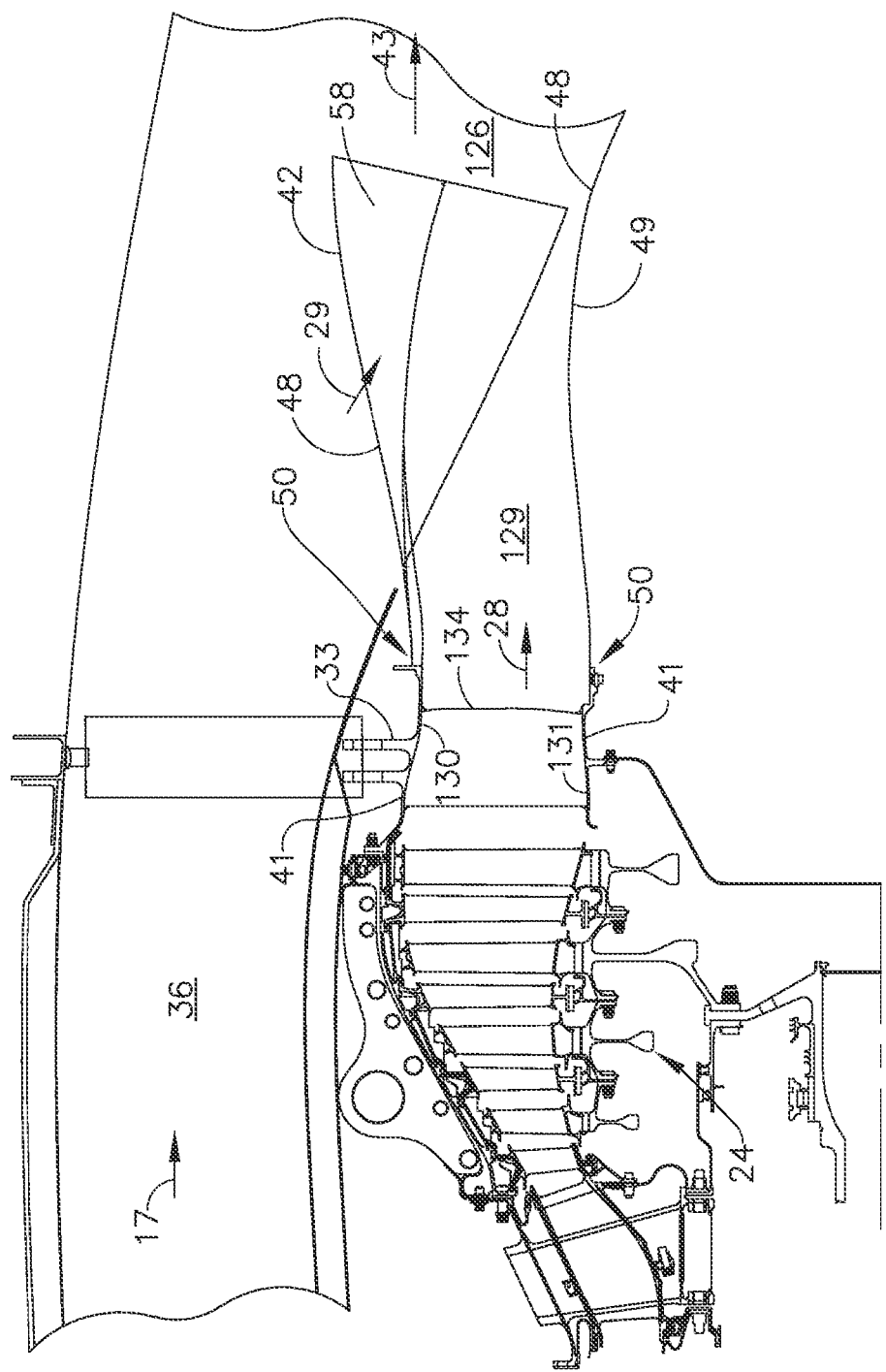
FIG. 2 is an enlarged cross-sectional side view illustration of the centerbody and mixer mounted on the rear turbine frame illustrated in FIG. 1.

Further referring to FIG. 2, the rear turbine frame 33 includes annular outer and inner casings or rings 130, 131 and a plurality of circumferentially spaced apart struts 134 extending therebetween. The struts 134 are airfoil shaped since bypass air passes between the adjacent ones thereof. A CMC mixer 42 is disposed axially downstream of the LPT 24 and radially between the bypass duct 36 and the LPT 24. The mixer 42 is attached to and supported by the outer ring 130 of the rear turbine frame 33. The mixer 42 includes a plurality of mixer chutes 58 extending radially inwardly into the exhaust flowpath 129 from the bypass duct 36. The mixer 42 mixes the hot combustion gases 28 from the LPT 24 with an injected portion 29 of the bypass air which is the outer air flow 17 resulting in an exhaust gas flow 43. The exhaust gas flow 43 flows into an exhaust section 126 terminating at an exhaust nozzle 47 of the engine 10 as illustrated in FIGS. 1 and 2. A CMC tail cone or centerbody 49 is attached to and supported by the inner ring 131 of the rear turbine frame 33. The mixer 42 and the centerbody 49 are attached to and supported by the outer and inner rings 130, 131 respectively of the rear turbine frame 33 by dual arm V brackets indicated at 50 as illustrated in FIGS. 1 and 2.

The outer and inner rings 130, 131 are exemplary embodiments of a first annular member 41 which may be made at least in part of a metallic material. The mixer 42 and the centerbody 49 are exemplary embodiments of a second annular member 48 which may be substantially made from a ceramic matrix composite material. The second annular members 48 are attached to and supported by the first annular members 41 using the dual arm V brackets 50. The first and second annular members 41, 48 have different first and second thermal expansion coefficients and are connected together with the dual arm V brackets 50.

Figure 3:
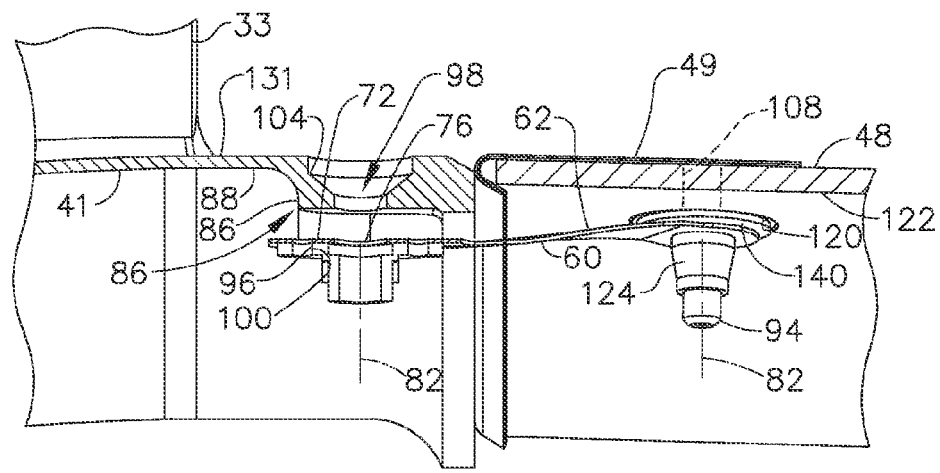
FIG. 3 is a cut away perspective view illustration of an exemplary bracket supporting the centerbody on the rear turbine frame illustrated in FIG. 2.
Figure 4:
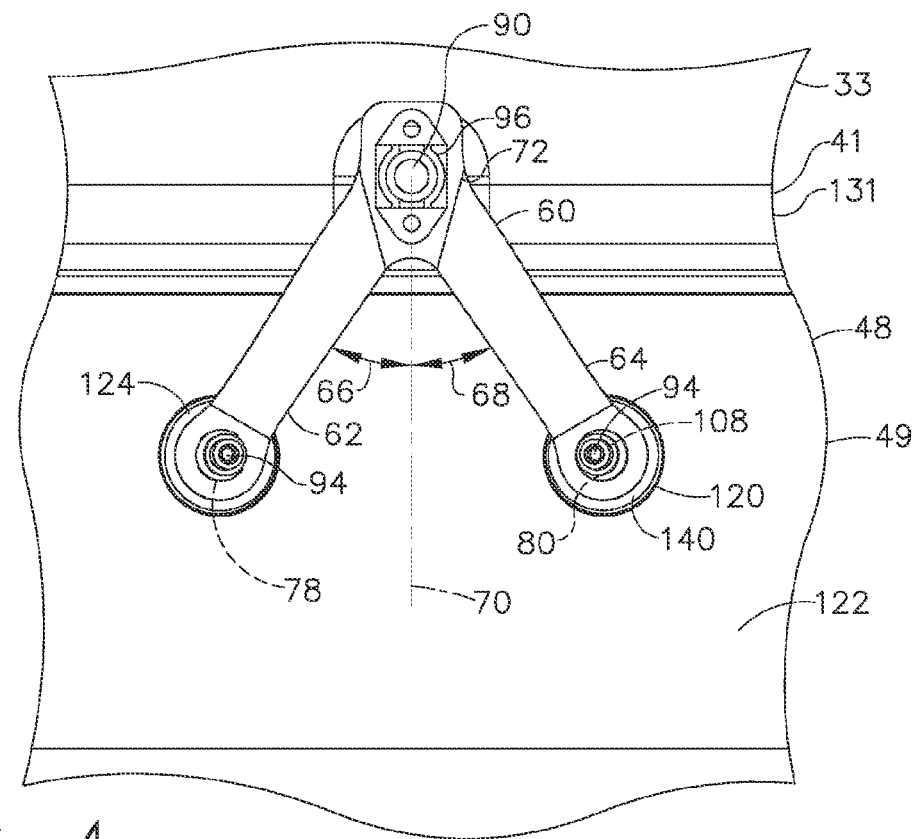
FIG. 4 is a radially outwardly looking elevational view illustration of the exemplary bracket supporting the centerbody on the rear turbine frame illustrated in FIG. 3.
Figure 4A:
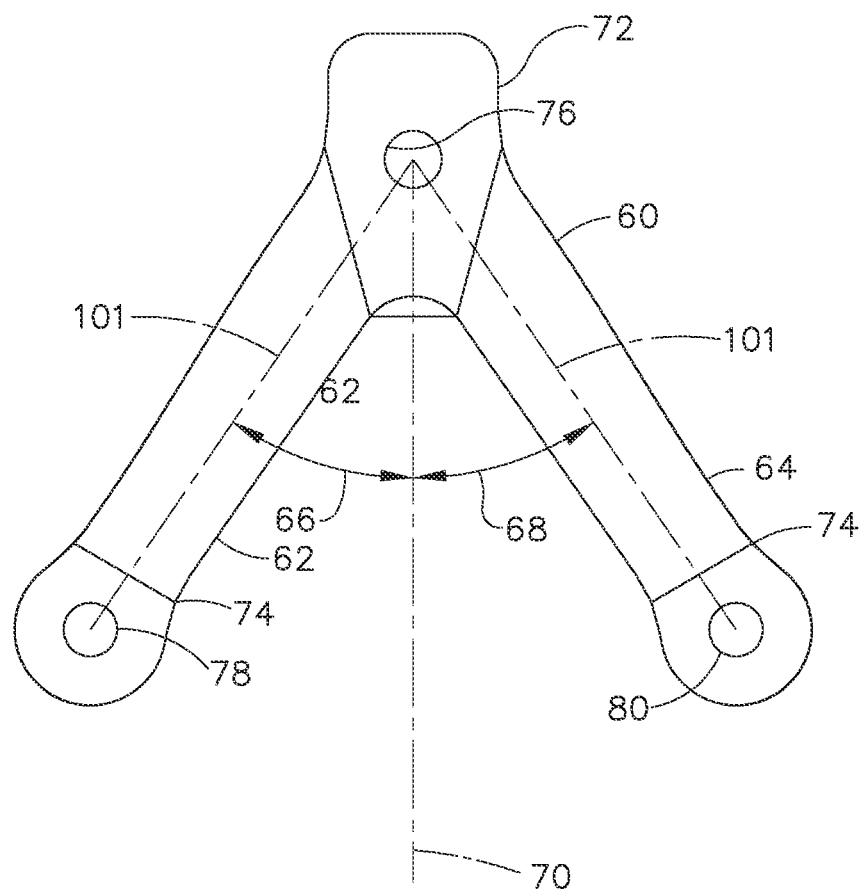
FIG. 4A is a cross sectional view schematical illustration of the exemplary bracket in FIG. 4.

Referring to FIGS. 3, 4, and 4A, the centerbody 49 is attached to and supported by the inner ring 131 of the rear turbine frame 33 using a flat bracket 60 embodiment of the dual arm V bracket 50. Each flat bracket 60 includes first and second arms 62, 64 extending equi-angularly away at first and second angles 66, 68 with respect to a bracket centerline 70 and axially away from a bracket base 72. The bracket base 72 includes a base hole 76 in the bracket base 72 and the first and second arms 62, 64 include first and second arm holes 78, 80 respectively in distal ends 74 of the first and second arms 62, 64. The bracket base 72 is designed to be screwed or bolted to the inner ring 131 by first bolts 90 disposed through the base hole 76. The first and second arms 62, 64 are designed to be screwed or bolted to the CMC centerbody 49 by second bolts 94 disposed through the first and second arm holes 78, 80 in the first and second arms 62, 64 respectively.

The embodiment of the flat bracket 60 illustrated in FIGS. 2-4 is substantially flat and the first and second arm holes 78, 80 and the base hole 76 have hole centerlines 82 that are substantially normal or perpendicular to the flat bracket base 72 and the flat first and second arms 62, 64. The hole centerlines 82 are substantially normal or perpendicular to the engine centerline axis 8 (illustrated in FIG. 1). A circumferential row 84 of bosses 86 having boss holes 98 extend radially inwardly from an inner circumferential ring surface 88 of and around the inner ring 131. The bracket bases 72 are secured or fastened to the bosses 86 on the inner circumferential ring surface 88 of the inner ring 131.

Figure 3A:
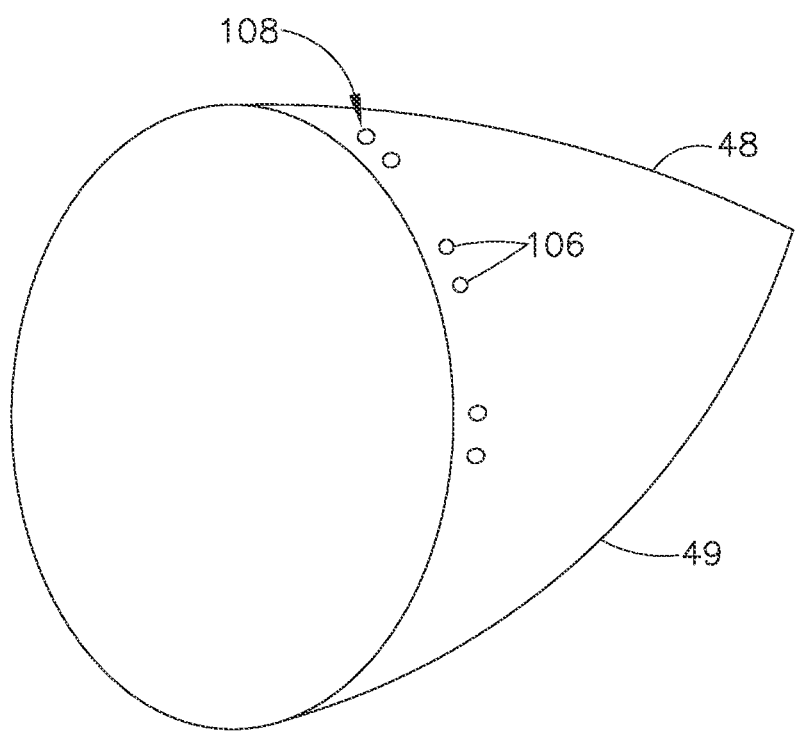
FIG. 3A is a perspective view schematic illustration of the centerbody illustrated in FIG. 2.
Figure 11:
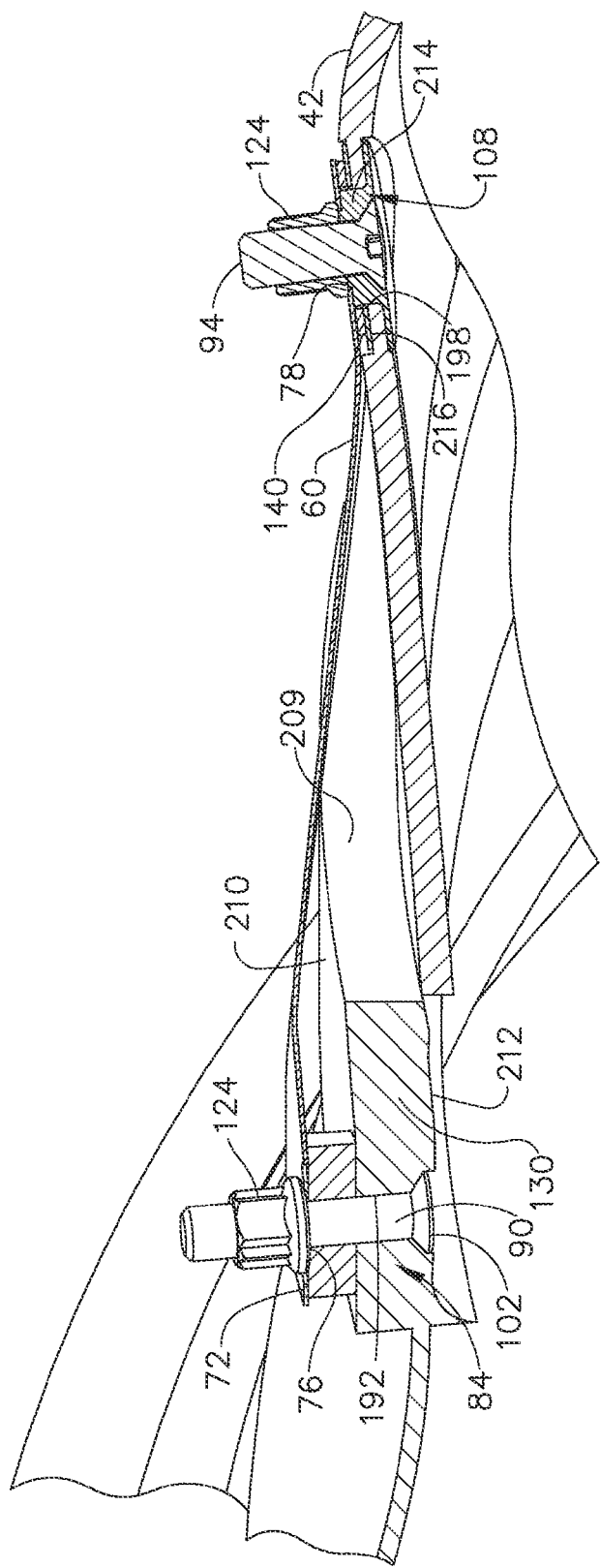
FIG. 11 is a cut away perspective view illustration of the flat bracket supporting the mixer illustrated in FIG. 10.

The bracket bases 72 are trapped between and pressed against the bosses 86 by a nut plate 96. The first bolts 90 are disposed through the boss holes 98 and the base holes 76 and threaded into plate holes 100 in the nut plate 96. The first bolts 90 include flush screw heads (not illustrated in FIG. 3, flush screw heads 102 are illustrated in FIG. 11) engaging conical bores 104 in the bosses 86. The first and second arm holes 78, 80 are aligned with corresponding pairs of centerbody holes 106 in a second circumferential row of holes 108 in the centerbody 49 illustrated in FIG. 3A. The first and second arm holes 78, 80 and the base hole 76 of the flat bracket 60 illustrated herein lay on midlines 101 which bisect each of the first and second arms 62, 64.

The second bolts 94 are disposed through the centerbody holes 106 in the second circumferential row of holes 108 and through the first and second arm holes 78, 80. A flat washer 120 against an annular inner centerbody surface 122 of the centerbody 49 and a Bellville washer 140 against each of the first and second arms 62, 64 are disposed between the centerbody 49 and the arms. The second bolts 94 are disposed through the corresponding centerbody holes 106 in the second circumferential row of holes 108, the washers, and the first and second arm holes 78, 80, and secured by a nut 124 or some other threaded means. One type of second bolt 94 and nut 124 illustrated herein is a Hi-Lok pin with a threaded end and a threaded collar respectively. Hi-Lok is a registered Trademark of the Hi-Shear Corporation located in Torrance Calif. The Bellville washer 140 is well known in the art and is used herein to apply a constant clamp load so as not to crush the CMC material of the centerbody 49.

Figure 5:
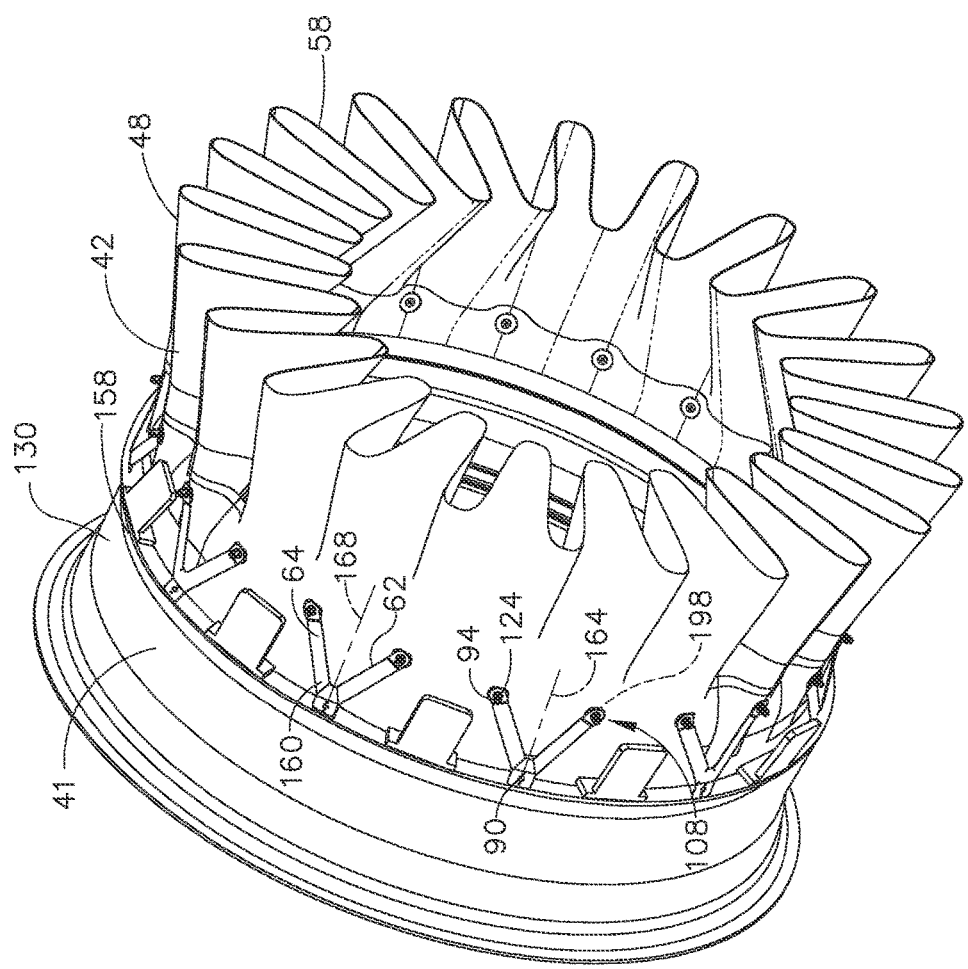
FIG. 5 is a perspective view illustration of an exemplary flanged bracket supporting the mixer on the rear turbine frame illustrated in FIG. 2.
Figure 6:
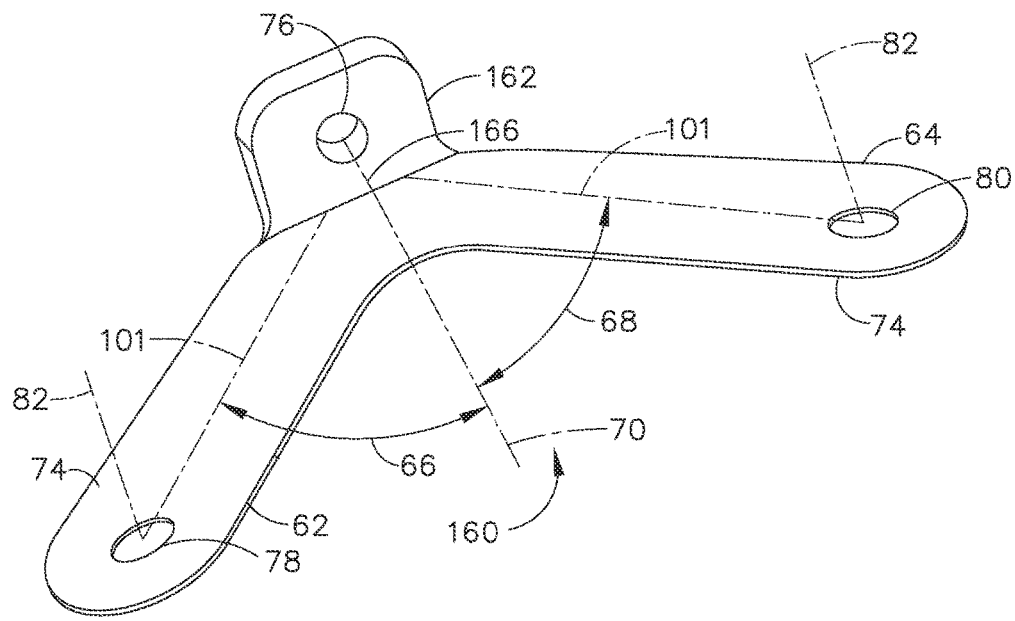
FIG. 6 is a perspective illustration of the bracket illustrated in FIG. 5.

Referring to FIGS. 5 and 6, the CMC mixer 42 is attached to and mounted upon an annular flange 158 around the outer ring 130 of the rear turbine frame 33 using a flanged bracket 160 embodiment of the dual arm V bracket 50. Each flanged bracket 160 includes substantially flat coplanar first and second arms 62, 64 extending equi-angularly away at first and second angles 66, 68 with respect to a bracket centerline 70 from a bracket flanged base 162. The flanged bracket 160 includes a bracket flanged base 162 angled substantially 90 degrees or perpendicular with respect to the flat coplanar first and second arms 62, 64. A base hole 76 extends through the flanged base 162. The first and second arms 62, 64 include first and second arm holes 78, 80 respectively in distal ends 74 of the first and second arms 62, 64. The flanged base 162 is screwed or bolted to the annular flange 158 of the outer ring 130 with outer first bolts 90 disposed through the base hole 76 and flange bolt holes 164 in the annular flange 158 around the outer ring 130 of the rear turbine frame 33. The first and second arms 62, 64 are designed to be screwed or bolted to the CMC mixer 42 with second bolts 94 disposed through the first and second arm holes 78, 80 in the first and second arms 62, 64 respectively.

The base holes 76 have base hole centerlines 166 that are substantially normal or perpendicular to the bracket flanged bases 162 and substantially parallel to the flat first and second arms 62, 64. The base hole centerlines 166 are substantially collinear with flange bolt hole centerlines 168 of the flange bolt holes 164 in the annular flange 158 around the outer ring 130 of the rear turbine frame 33. The base and flange hole centerlines 166, 168 are substantially parallel to the engine centerline axis 8 (illustrated in FIG. 1).

The first and second arm holes 78, 80 have hole centerlines 82 that are substantially normal or perpendicular to the flat first and second arms 62, 64. The hole centerlines 82 are substantially normal or perpendicular to the engine centerline axis 8. The first and second arm holes 78, 80 are aligned with corresponding composite holes 198 in a second circumferential row 108 of the composite holes 108 (illustrated in FIG. 11) in the CMC mixer 42. The first and second arm holes 78, 80 of the flanged bracket 160 illustrated herein lay on midlines 101 which bisect each of the first and second arms 62, 64. The base hole 76 and the flanged base 162 of each of the flanged brackets 160 are centered with respect to the first and second arms 62, 64 of the flanged base 162. The second bolts 94 are disposed through the corresponding composite holes 198 in the second circumferential row of the composite holes 198 and through the first and second arm holes 78, 80 and secured by a nut 124 or some other threaded means as further illustrated in more detail in FIG. 11.

Figure 7:
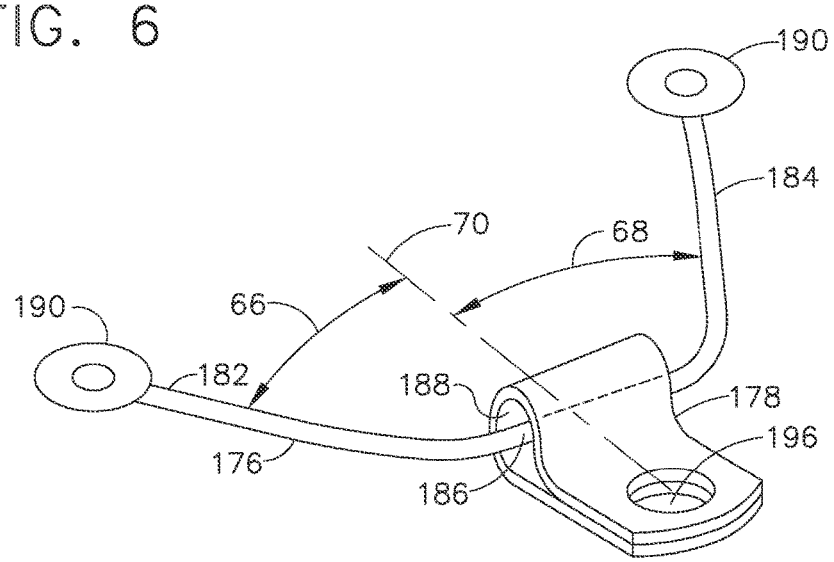
FIG. 7 is a perspective illustration of a clamped rod alternative bracket.

A clamped bent rod bracket 174 illustrated in FIG. 7 serves as a third alternative dual arm V bracket 50 to attach a composite gas turbine annular member to a metallic gas turbine annular member. The metallic gas turbine annular member is exemplified herein as the rear turbine frame 33 and the composite gas turbine annular member is exemplified herein as the CMC mixer 42. Each bent rod bracket 174 includes a bent rod 176 clamped by a rod clamp 178 that attached to and supported by the outer ring 130 of the rear turbine frame 33. The bent rod 176 may be hollow or solid. The bent rod 176 includes first and second rod arms 182, 184 and a rod base 186 therebetween. The first and second rod arms 182, 184 extend equi-angularly away at first and second angles 66, 68 with respect to a bracket centerline 70 and axially away from the rod base 186.

The rod clamp 178 includes a clamp loop 188 to secure the rod 176 to the clamp. The rod base 186 is held by and secured to the outer ring 130 by the rod clamp 178 screwed or bolted to the outer ring 130 through a clamp hole 196 in the rod clamp 178. The bent rod 176 is secured to the CMC or composite gas turbine annular member by ring connectors 190 at distal ends 74 of the first and second rod arms 182, 184. First bolts 90 (not illustrated in FIG. 7) may be disposed through the clamp hole 196 and ring holes 192 around the outer ring 130 of the rear turbine frame 33 to screw or bolt the rod clamp 178 to the ring. Second bolts 94 (not illustrated in FIG. 7) disposed through the ring connectors 190 and composite holes 198 in the CMC mixer 42 screw or bolt the first and second rod arms 182, 184 to the mixer as illustrated in FIGS. 10 and 11.

Figure 8:
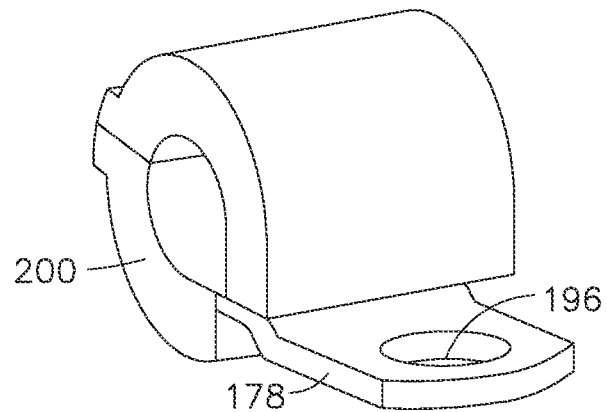
FIG. 8 is a perspective illustration of a cushioned clamp to hold the clamped rod illustrated in FIG. 7.
Figure 9:
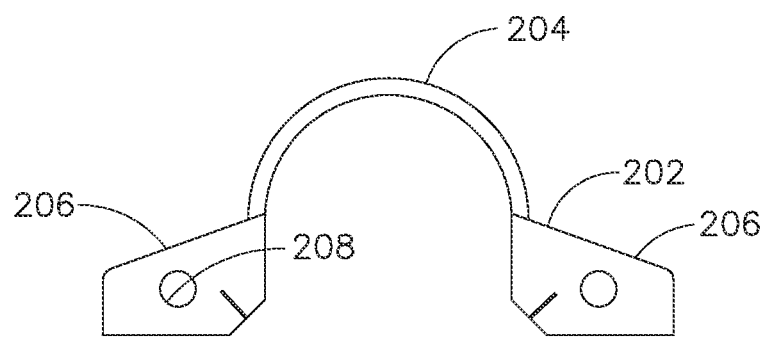
FIG. 9 is a perspective illustration of a strap clamp to hold the clamped rod illustrated in FIG. 7.

The rod clamp 178 may have a cushioned loop 200 as illustrated in FIG. 8. An alternative to the rod clamp 178 is a clamp strap 202 illustrated in FIG. 9. A strap loop 204 extends between two spaced apart loop bases 206 that include strap holes 208 used to secure the strap loop 204 to the outer ring 130 of the rear turbine frame 33 illustrated in FIG. 10.

Figure 10:
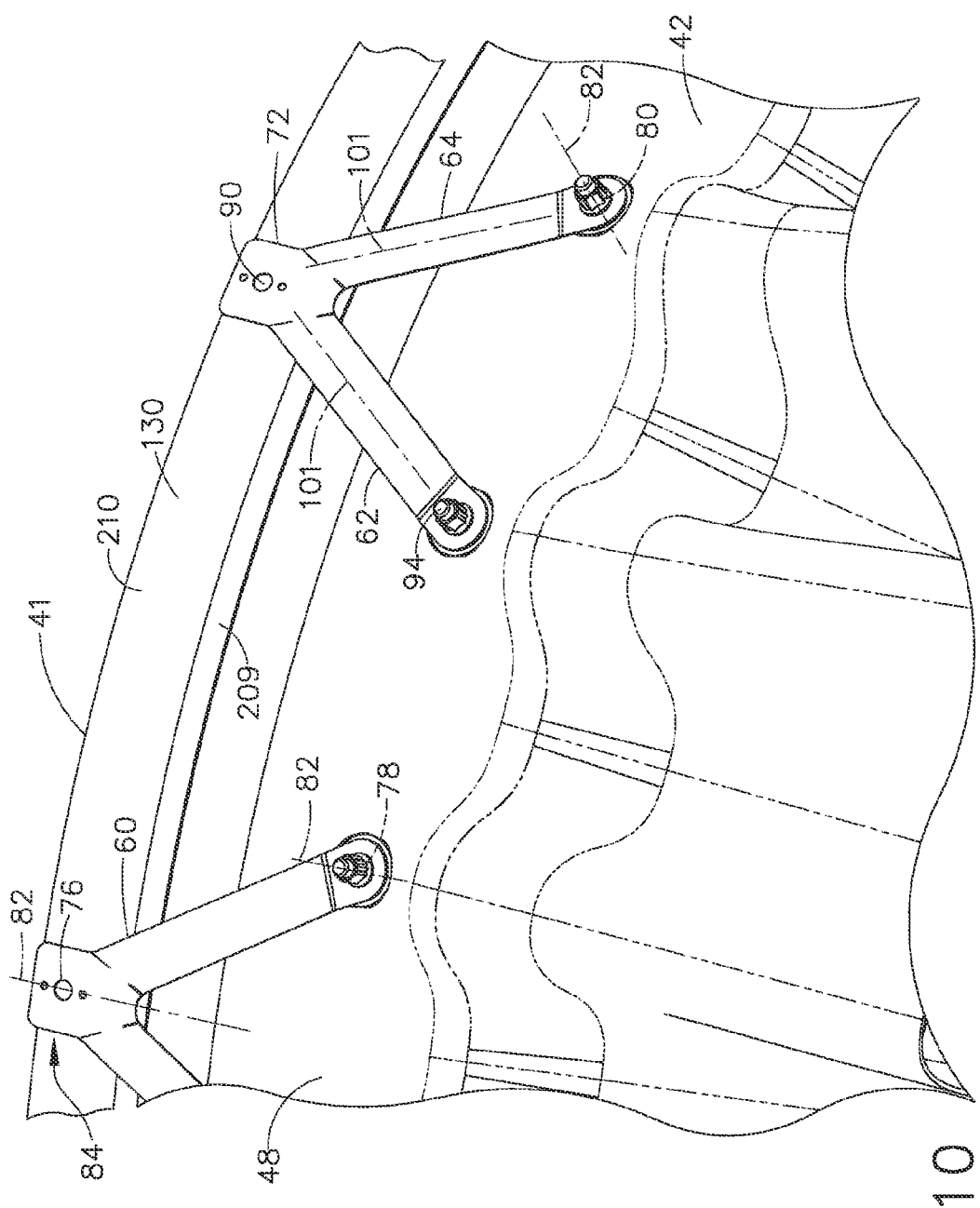
FIG. 10 is a perspective view illustration of a flat bracket supporting the mixer on the rear turbine frame illustrated in FIG. 2.

Illustrated in FIGS. 10 and 11 is an embodiment of the flat bracket 60 (similar to the flat bracket illustrated in FIGS. 2-4) securing the CMC mixer 42 to the outer ring 130 of the rear turbine frame 33. A circumferential row 84 of bosses 86 having boss holes 98 extend radially outwardly from an outer circumferential ring surface 210 of a thickened end portion 209 of the outer ring 130. The boss holes 98 extend radially through the bosses 86 and the thickened end portion 209 of the outer ring 130. Bracket bases 72 of the flat brackets 60 includes base holes 76 and are secured or fastened to the thickened end portion 209 with first bolts 90 disposed through the base holes 76 and the boss holes 98 along the outer circumferential ring surface 210 of the outer ring 130. The first bolts 90 are secured by nuts 124. The first bolts 90 are disposed through the base holes 76 and the boss holes 98 and threaded into the nut 124. The first bolts 90 include conical screw heads 102 engaging counter sinks of the boss holes 98 in an inner circumferential ring surface 212 of the thickened end portion 209.

The first and second arms 62, 64 are designed to be screwed or bolted to the CMC mixer 42 by second bolts 94 disposed through the first and second arm holes 78, 80 in the first and second arms 62, 64 respectively and through the composite holes 198 in the CMC mixer 42. It is desirable to control or limit the compressive load into the CMC mixer 42. A metal insert 214 radially disposed through the composite holes 198, a circular washer 216 disposed around the metal insert 214, and the nut 124 provide this function. The nuts 124 engage and bottom out on the first and second arms 62, 64 of the bracket 60 and the second bolts 94 engage and bottom out on the metal inserts 214 disposed in the composite holes 198 in the CMC mixer 42 illustrated in FIG. 3A to limit the crush load into the CMC material of the mixer 42. A Bellville washer 140 is disposed around the metal insert 214 between each arm of the bracket 60 and the circular washers 216.

The flat bracket 60 and the flat first and second arms 62, 64 are substantially flat. The first and second arm holes 78, 80 and the base hole 76 have hole centerlines 82 that are substantially normal or perpendicular to the flat bracket base 72 and the flat first and second arms 62, 64. The hole centerlines 82 are substantially normal or perpendicular to the engine centerline axis 8.

The first and second arm holes 78, 80 are aligned with corresponding composite holes 198 in a second circumferential row 108 of composite holes 198 in the CMC mixer 42. The first and second arm holes 78, 80 of the flanged bracket 160 illustrated herein lay on midlines 101 which bisect each of the first and second arms 62, 64. The base hole 76 is centered with respect to the first and second arms 62, 64 and the bracket base 72.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. A gas turbine engine assembly, comprising:
    first and second annular members having different first and second thermal expansion coefficients, wherein:
    the first and second annular members are connected together with dual arm V brackets,
    each of the dual arm V brackets comprises first and second arms angularly spaced apart from a bracket centerline,
    the first and second arms are substantially flat and coplanar and extend axially away from a bracket base,
    the bracket bases are attached to a first one of the first and second annular members, and
    the first and second arms are attached to a second one of the first and second annular members.

2. The assembly as claimed in claim 1, wherein the bracket bases and the first and second arms are substantially flat, the assembly further comprising:
    first screws or bolts disposed through base holes in the bracket bases attaching the bracket bases to the first one of the first and second annular members; and
    second screws or bolts disposed through first and second arm holes in distal ends of the first and second arms respectively attaching the first and second arms to the second one of the first and second annular members.

3. The assembly as claimed in claim 2, wherein the bracket bases are bracket flanged bases angled with respect to the first and second arms.

4. The assembly as claimed in claim 3, wherein the bracket flanged bases are angled substantially 90 degrees or perpendicular with respect to the first and second arms.

5. The assembly as claimed in claim 1, wherein the second annular member is substantially made from a ceramic matrix composite material.

6. The assembly as claimed in claim 5, wherein the first annular member is made at least in part of a metallic material.

7. The assembly as claimed in claim 6, wherein the first and second annular members are disposed in a gas turbine engine hot section.

8. A gas turbine engine assembly, comprising:
    first and second annular members having different first and second thermal expansion coefficients, wherein:
    the first and second annular members are connected together with dual arm V brackets,
    each of the dual arm V brackets comprises first and second arms angularly spaced apart from a bracket centerline,
    the first and second arms are substantially flat and extend axially away from a bracket base
    the bracket bases are attached to a first one of the first and second annular members, and
    the first and second arms are attached to a second one of the first and second annular members, wherein:
    the dual arm V brackets are clamped bent rod brackets comprising bent rods mounted to rod clamps,
    the first and second arms are first and second rod arms, respectively,
    the bracket bases are rod bases,
    the bent rods comprise the first and second rod arms and the rod bases therebetween, and
    the rod clamps comprise clamp loops securing the rod bases to the rod clamps,
    the assembly further comprising:
    first screws or bolts disposed through clamp holes in the rod clamps attaching the rod clamps to the first one of the first and second annular members; and
    second screws or bolts disposed through ring connectors at distal ends of the first and second rod arms attaching the first and second rod arms to the second one of the first and second annular members.

9. The assembly as claimed in claim 8, wherein the bent rods are hollow or solid.

10. A gas turbine engine assembly, comprising:
    first and second annular members having different first and second thermal expansion coefficients, wherein:
    the first and second annular members are connected together with dual arm V brackets, each of the dual arm V brackets comprises first and second arms angularly spaced apart from a bracket centerline,
the first and second arms are flat and extend axially away from a bracket base,
the bracket bases are attached to a first one of the first and second annular members, and
the first and second arms are attached to a second one of the first and second annular members, wherein:
the dual arm V brackets comprise clamp straps and bent rods,
the first and second arms are first and second rod arms,
the bracket bases are rod bases,
the bent rods comprise the first and second rod arms extending axially away from the rod bases between the first and second rod arms, and
the clamp straps comprise strap loops extending between two spaced apart loop bases,
the assembly further comprising:
first screws or bolts disposed through strap holes in the spaced apart loop bases clamping the rod bases to the first one of the first and second annular members; and
second screws or bolts disposed through ring connectors at distal ends of the first and second rod arms attaching the first and second rod arms to the second one of the first and second annular members.

11. A gas turbine engine assembly, comprising:
a turbine frame comprising annular outer and inner casings or rings circumscribed about a centerline axis, and a plurality of circumferentially spaced apart struts extending there between; and
an annular mixer substantially made from a ceramic matrix composite material, and circumscribed about the centerline axis,
wherein:
the annular mixer comprises a plurality of mixer chutes,
the annular mixer is connected to and supported by the outer ring with dual arm V brackets,
each of the dual arm V brackets comprises first and second arms angularly spaced apart from a bracket centerline,
the first and second arms extend axially away from a bracket base,
the bracket bases are attached to the outer casing or ring, and
the first and second arms are attached to the annular mixer,
and wherein:
a circumferential row of bosses extends radially outwardly from an outer circumferential ring surface of a thickened end portion of the outer ring, the bosses comprise boss holes extending radially therethrough, and the bracket bases and the first and second arms are substantially flat, the assembly further comprising:
first screws or bolts disposed through base holes in the bracket bases and the boss holes for attaching the bracket bases to the outer ring; and
second screws or bolts disposed through first and second arm holes in distal ends of the first and second arms respectively attaching the first and second arms to the annular mixer.

12. The assembly as claimed in claim 11, further comprising:
an annular flange around the outer ring,
wherein:
the bracket bases are bracket flanged bases angled with respect to the first and second arms, and
the bracket flanged bases are attached to the annular flange.

13. The assembly as claimed in claim 12, wherein:
the flanged bases are bolted to the annular flange with outer first bolts disposed through base holes extending through the flanged bases and flange bolt holes in the annular flange,
the first and second arms are bolted to the mixer with second bolts disposed through first and second arm holes in the in distal ends of the first and second arms respectively, and
the base holes have base hole centerlines substantially normal or perpendicular to the bracket flanged bases and substantially parallel to the first and second arms.

14. The assembly as claimed in claim 11, wherein the first and second arm holes are aligned with corresponding composite holes in a circumferential row of the composite holes, the assembly further comprising:
metal inserts radially disposed through the composite holes;
circular washer disposed around the metal inserts; and
Bellville washers disposed through the composite holes and around the metal inserts and radially between the first and second arms and the annular mixer,
wherein:
the second screws or bolts disposed through the metal inserts and secured by nuts, and
the nuts engaging and bottoming out on the first and second arms and the second bolts engaging and bottoming out on the metal inserts.

15. The assembly as claimed in claim 11, further comprising:
an annular centerbody substantially made from a ceramic matrix composite material and circumscribed about the centerline axis connected to and supported by the inner ring with a second set of dual arm flat brackets,
wherein:
the bracket bases are attached to the inner casing or ring, and the first and second arms are attached to the annular centerbody.

16. A gas turbine engine assembly, comprising:
a turbine frame comprising annular outer and inner casings or rings circumscribed about a centerline axis and a plurality of circumferentially spaced apart struts extending there between; and
an annular centerbody substantially made from a ceramic matrix composite material and circumscribed about the centerline axis connected to and supported by the inner ring with dual arm flat brackets,
wherein:
each of the dual arm flat brackets comprises first and second arms angularly spaced apart from a bracket centerline,
the first and second arms extend axially away from a bracket base,
the bracket bases are attached to the inner casing or ring, and
the first and second arms are attached to the annular centerbody,
wherein:
the bracket bases are bolted to the inner ring with outer first bolts disposed through base holes extending through the bracket bases,
the first and second arms are bolted to the mixer with second bolts disposed through first and second arm holes in the in distal ends of the first and second arms respectively, the bracket bases are substantially flat, and
the first and second arm holes and the base hole have hole centerlines substantially normal or perpendicular to the bracket base and the first and second arms;
and wherein the gas turbine engine assembly further comprising:
a circumferential row of bosses comprising boss holes extending radially inwardly from an inner circumferential ring surface of and around the inner ring, wherein:
the bracket bases are trapped between and pressed against the bosses by a nut plate,
the first bolts are disposed through the boss holes and the base holes,
the first bolts are threaded into plate holes in the nut plate,
the first bolts comprise flush screw heads engaging conical bores in the bosses, and
the first and second arm holes are aligned with corresponding pairs of centerbody holes in a second circumferential hole row in the centerbody.

\* \* \* \* \*